United States Patent [19]

Peter, III et al.

[11] 4,413,902

[45] Nov. 8, 1983

[54] FOUR-BAR INTERPOSER MECHANISM FOR OFFSET PRINTING

[75] Inventors: Emmett B. Peter, III, Orlando; Wilson P. Rayfield, Longwood, both of Fla.

[73] Assignee: Burroughs Corp., Orlando, Fla.

[21] Appl. No.: 342,243

[22] Filed: Jan. 25, 1982

Related U.S. Application Data

[63] Continuation-in-part of Ser. No. 138,704, Apr. 9, 1980, abandoned.

[51] Int. Cl.³ .................... G03B 27/48; G03B 27/50; B65H 9/04

[52] U.S. Cl. .................................... 355/48; 271/243

[58] Field of Search ........................ 355/47, 48, 50; 271/243, 244, 245; 101/37, 235, 248, 276, 278, 279; 226/62

[56] References Cited

U.S. PATENT DOCUMENTS

| | | | |
|---|---|---|---|
| 1,288,710 | 12/1918 | Sheldon | 271/243 |
| 2,074,720 | 3/1937 | Eckhard | 271/243 |
| 2,208,048 | 7/1940 | Durup | 271/243 |
| 2,888,262 | 5/1959 | Montgomery | 271/244 |
| 3,181,418 | 5/1965 | Durlofsky | 355/14 R |
| 3,434,640 | 3/1969 | Coutant et al. | 226/62 |
| 3,615,128 | 10/1971 | Bhagat | 355/14 R |
| 3,914,041 | 10/1975 | Opravil | 271/243 |
| 3,915,447 | 10/1975 | Perno | 271/243 |
| 4,022,525 | 5/1977 | Boudouris | 352/180 |
| 4,150,886 | 4/1979 | Merkel et al. | 352/180 |

*Primary Examiner*—Monroe H. Hayes
*Attorney, Agent, or Firm*—Carl Fissell, Jr.; David G. Rasmussen; Kevin R. Peterson

[57] ABSTRACT

Non-impact offset printing apparatus providing repeatable top-to-bottom registration of printed matter transferred to cut sheet paper fed in the "portrait" direction by means of a timer-interposer mechanism which contacts the leading edge of each incoming sheet and times the entry of the sheet into the transfer point adjacent to the rim of the offset non-impact rotary printing apparatus effectively creating positive and accurate registration of all four margins of printed matter on each page.

2 Claims, 3 Drawing Figures

FOUR-BAR INTERPOSER MECHANISM FOR OFFSET PRINTING

This application is a continuation-in-part of Ser. No. 138,704, filed Apr. 9, 1980, now abandoned.

BACKGROUND OF THE INVENTION

1. Field of the Invention

The present invention relates broadly to the field of printing apparatus and more specifically to the field of non-impact offset printing apparatus wherein cut sheet paper is fed to a rotatable drum type printing apparatus for accurate registration of the margins of the printed matter on each sheet.

2. Description of the Prior Art

In a non-impact printer of the offset type, it is necessary to accurately and repeatably match up the paper to its intended image so that when the image is affixed to the page the proper margins are achieved. A mechanism for providing this makes for repeatable registration of printed matter in the direction of paper travel assuming proper registration transverse to the paper's motion is achieved by some other means as for example, edge guides or guide walls, etc.

In a compact non-impact printer it is possible for the image to be placed on the offset medium (drum or belt) before a sheet of paper is ever fed. Therefore, it is possible for feed and transport error to affect registration. The motion of the paper must be "recalibrated" so that the page will meet up with its intended image. To provide this recalibration, registration fingers or an interposer become a necessary adjunct to the printing apparatus.

There are several requirements that such a mechanism should fulfill. The mechanism should not take an inordinate amount of space. Its location should be as close as possible to the transfer location. It should be relatively inexpensive and reliable to maintain and operate. It should be mechanically linked (i.e. through timing belts) to the offset medium for highest accuracy. Its motion should provide the proper transition from paper path speed to transfer speed. It should be a cyclic device with a frequency of one actuation per registered sheet of paper. A number of registration methods are possible that attempt to solve this task. However, they all fall short in one or more of the above requirements.

For example, rotating fingers are simple, but they take up too much space and they do not provide the ideal transition motion that is required for smooth operation of the device. A belt with fingers attached would work, but belts are relatively expensive.

SUMMARY OF THE INVENTION

The mechanism of the present invention, however, fulfills all of the necessary requirements. The path of a finger appropriately placed on the coupler of a four-bar mechanism can be made to coincide with the ideal path for registration fingers. Also, through more detailed synthesis, the speed of the finger can be tailored to provide the ideal transition between higher speed relating course paper path motion and the lower, more finely controlled speed of the transfer area. The present mechanism is compact, can be placed close to the transfer point and one revolution of the input link of the device provides for the registration of exactly one sheet of paper with all of its margins accurately maintained. Since the present four-bar interposer apparatus dwells below the paper path, the gap between sheets is decreased to a minimum at the transfer point which is a factor in increasing the throughput of a cut sheet printer. The four-bar interposer mechanism therefore represents a novel improvement over the existing methods earlier referred to.

DESCRIPTION OF THE PREFERRED EMBODIMENT

In a non-impact printer of the offset type, it is necessary to accurately and repeatably match up paper to its intended image so that when the image is impressed on the page the proper margin is achieved. In a compact non-impact printer, it is possible for the image to be placed in the offset device (drum or belt), before a sheet of paper is fed. Therefore, it is possible for feed and transport error to affect registration. The novel mechanism described herein is a means for providing repeatable top-to-bottom registration of printed matter transferred to cut sheet paper fed in the so-called "portrait" direction which in the case of an 8½"×11" sheet of paper is the 11" direction or dimension.

In the case of general printer development, the following features are desirable in an interposer;

1. It must operate at one cycle per sheet for machine timing advantage.
2. It must operate in an area very close to the offset device for keeping transport error from creeping back in after registration is accomplished.
3. It must be compact in size.
4. It must be inexpensive to manufacture.
5. It must be reliable.
6. It must be mechanically connected to the transfer movement mechanism and/or the offset media for accurate link-up with paper sheets.
7. The speed match-up for proper registration action must be accurate.

Figure 1:
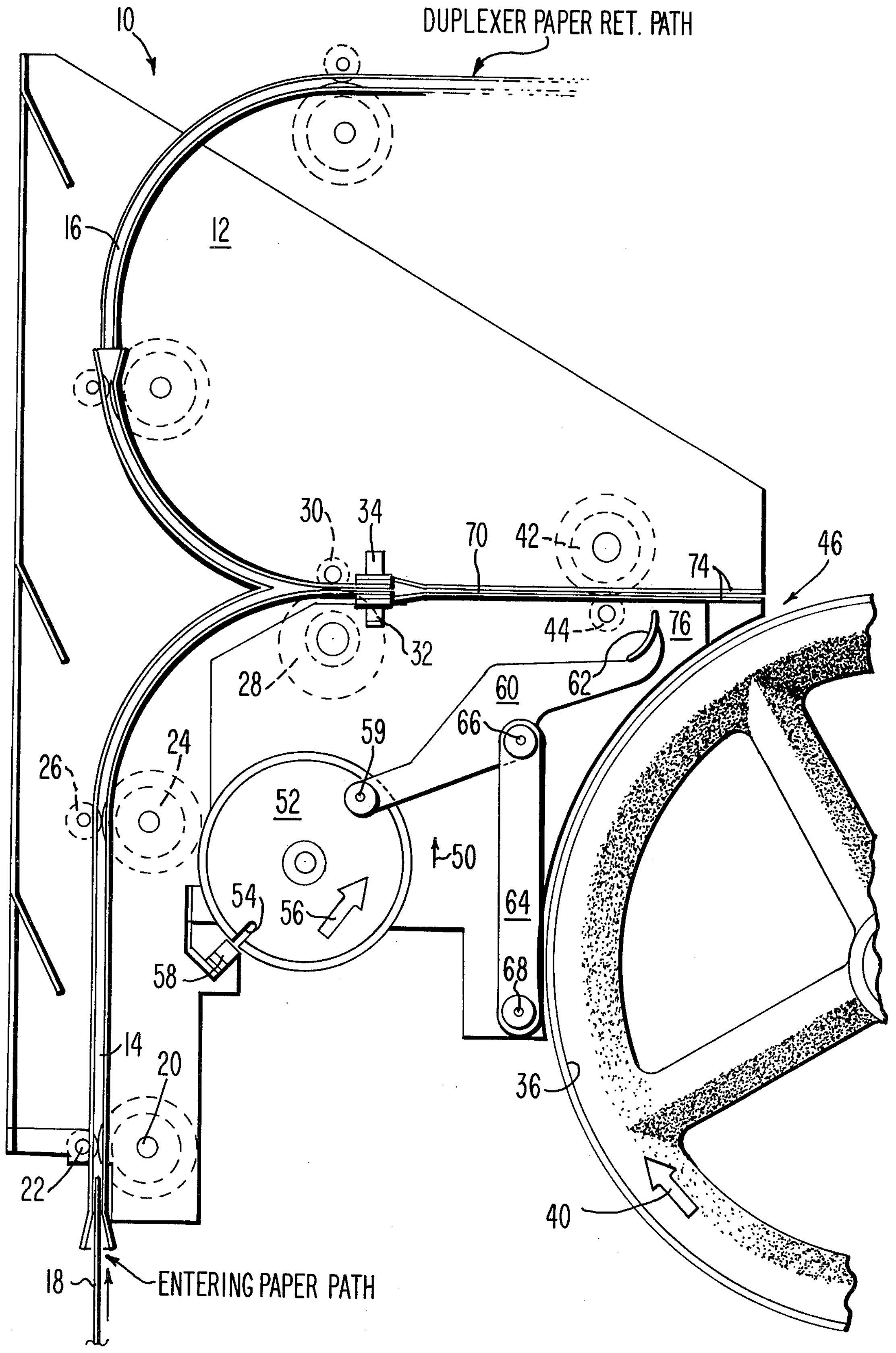
FIG. 1 is a side elevational view, slightly enlarged, of the multiple paths available to the present four-bar interposer mechanism apparatus.

The apparatus embodying the present invention, as seen in FIG. 1, is a novel means for providing repeatable top-to-bottom registration of untreated, readily available, cut sheet paper (e.g. 8½"×11") prior to the information data transfer process. Blank sheets of paper from an input hopper (not shown) are advanced to a process station which may, for example, be a rotating photo-receptor drum. In order for the data to be intelligible, the blank paper must be registered (or synchronized) with the image that has previously been placed upon the receptor drum. This means that the data will be placed correctly upon the paper in the "portrait" direction of feed by which is meant that the "11" inch direction or dimension is utilized.

A number of different interposing mechanisms have been suggested in the past, but each has had its own peculiar set of unwieldy conflicts or non-efficient aspects and limitations. Since it is desirable to keep the paper flow continuous, stop-start finger interposers are not acceptable. Neither are rotating fingers, since the space required by such a mechanism prevents the fingers from being positioned close enough to provide top efficiency of operation. Interference with the rotating drum surface is another problem which limits the closeness of the interposer to the transfer point, i.e., the point where the paper a actually meets the drum or printing device. Stopping and starting the paper for normal amounts of time would tend to cause the front edge of one sheet to crash into the rear edge of the sheet in front of this first sheet. Belts are inherently expensive to fabricate, maintain and utilize.

Figure 3:
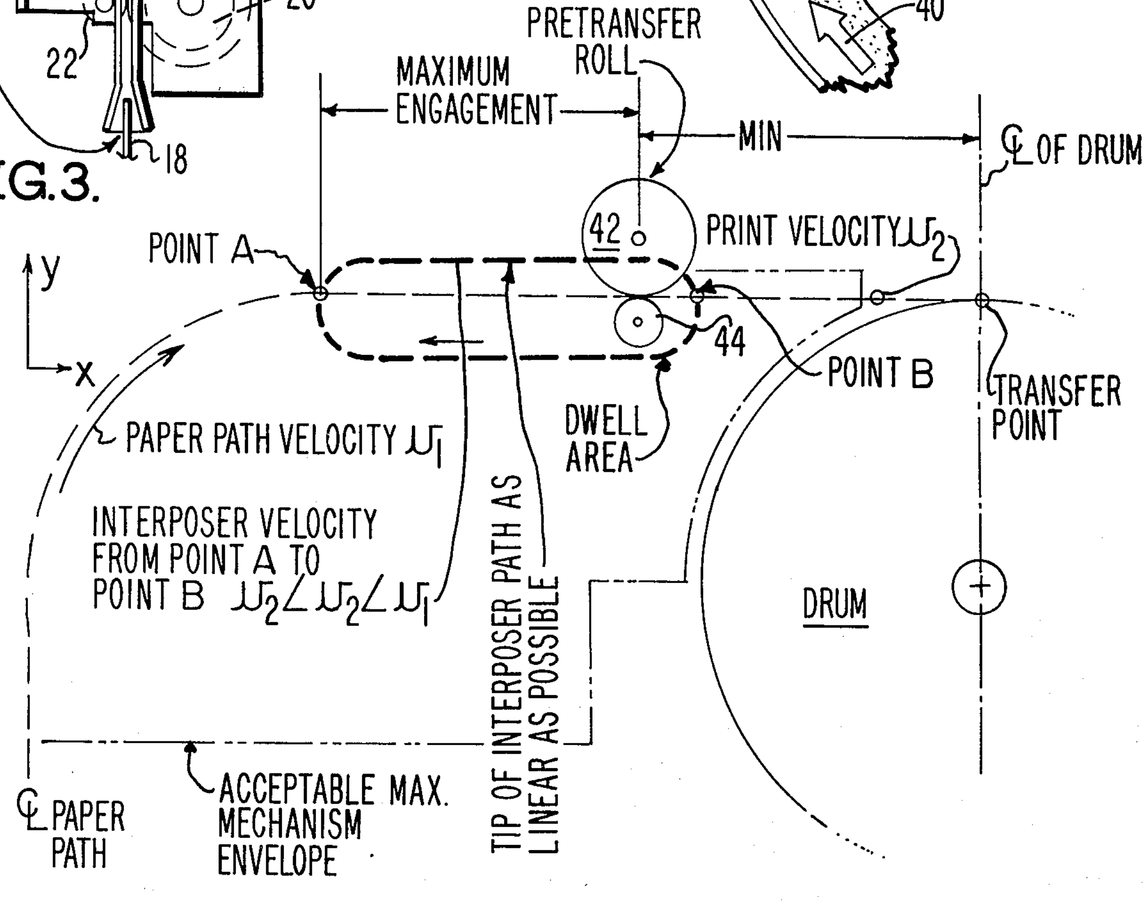
FIG. 3 is a schematic diagram of the acceptable maximum mechanism envelope or path of an interposer device for use with the present invention.

As seen in FIG. 3 of the drawings, the desired path for the interposer is not one easily obtained by conventional registration finger motion (i.e. rotating devices or fingers on a belt). However, by synthesizing an appropriate four-bar linkage the coupler curve can be used to provide the desired motion. The concept of a four-bar coupler curve interposer action represents a novel improvement over existing methods. The synthesis of such a mechanism produces a four-bar interposer linkage. Such interposer provides all the desirable features previously listed. Also, its speed can be tailored to provide the proper interception action and the dwell portion (beneath the paper path) can be designed so that the nose-to-tail distance (window) resulting between sheets is minimal, which is an important factor in throughput of cut sheet printers having a given print speed.

As noted by reference to FIG. 3, an acceptable maximum mechanism envelope has been previously calculated in order most efficiently to take advantage of the available non-interfering space between the paper feed mechanism and the photo-receptor drum. As previously stated, the interposer mechanism must be positioned as close to the transfer point as possible, (this point will be described in detail later on herein), to avoid timing problems associated with registering the sheet on the printing drum as well as to avoid the possibility of overlap or paper jams. Detailed description of the operational assembly performing the various functions will be discussed, first with respect to FIGS. 1 and 2.

The mechanical structure of the four-bar interposer apparatus 10 embodying the present invention is seen in FIG. 1 to include a vertical wall structure 12 of rigid material, such for example, as aluminum, etc. Two oppositely disposed tracks 14 and 16 form respectively, an entering sheet paper path from below and a return sheet paper "duplexer" path from above, as is described in more detail in copending U.S. application filed June 26, 1980, U.S. Ser. No. 163,394 in the name of Emmett B. Peter III entitled "Duplex Printing Paper Handling Mechanism for Cut Sheet Printing", assigned to the same assignee as the present invention. Cut sheet paper 18 is, or may be fed from a sheet hopper (not shown) into the nip between the drive and idler rollers 20 and 22 respectively, upwardly, FIG. 1, along track 14 to the nip of drive and idler rollers 24 and 26. Continued driven movement caused by these drive rollers of paper sheet 18 forces the paper to enter the nip between the drive and idler rollers 28 and 30 respectively, at which point passage of the paper 18 interrupts light passing across the paper path from the jam detector photo diode 32 to the output receiving signal generating detector 34.

Because the paper transport and feed apparatus are inherently not too accurate, it becomes necessary to provide some means of registering the paper sheet so that it is located immediately before the photo-receptor drum 36, thus insuring that the printed indicia (intelligence-data) will be properly and accurately placed on the paper as the paper is passed around the photo-receptor drum surface 38. Since stopping and starting the paper 18 creates more problems than it solves, the paper is slowed in forward movement to coincide with the rotative movement of the drum in the direction of arrow 40. The timing involved is critical. The solution involves calculation of the desired path of the so-called interposing device or mechanism and synthesizing an appropriate "coupler curve" for a four-bar linkage with the coupler curve. The four-bar coupler curve interposer action represents a novel improvement over existing methods as will now be described.

Figure 2:
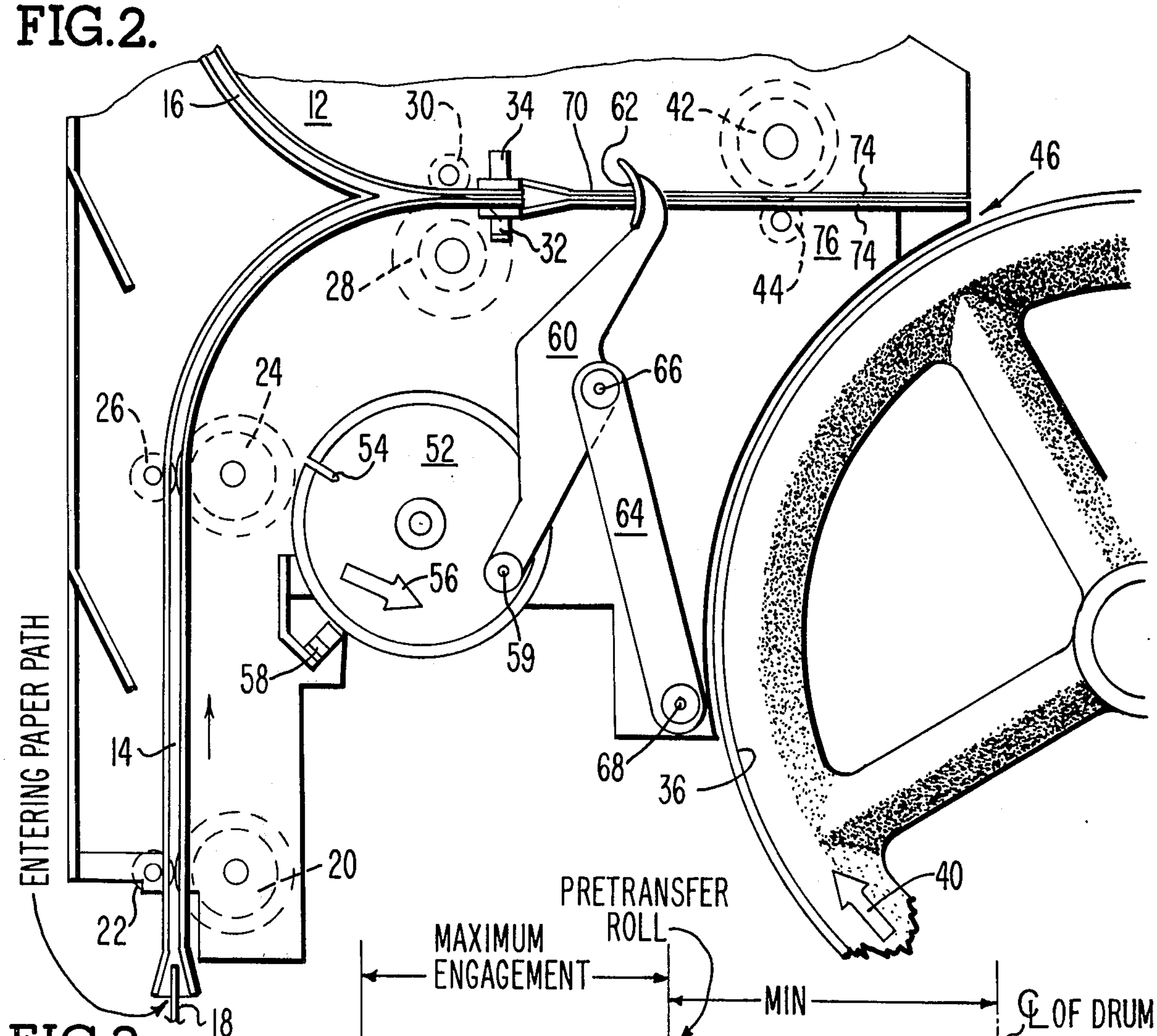
FIG. 2 is a view of a portion of the device of FIG. 1 showing the interposer mechanism in its active position to engage a sheet of paper on its inward path toward the receptor drum.

As seen most clearly in FIGS. 1 and 2, a so-called four-bar interposer mechanism 50 is arranged beneath the upper and lower converging paper tracks 16 and 14 respectively. Mechanism 50, as shown, comprises a rotatable pulley wheel 52 provided with a peripheral timing notch 54 rotatable by means (not shown) counterclockwise (CC) in the direction of arrow 56 past a timing transducer, e.g. photo transistor 58, which is electrically interconnected to software (not shown) for precisely synchronizing the timing of the paper 18 advance and the imaging of the drive member 36.

Secured to pulley 52 at 180° in opposition to the transducer timing notch 54 is a pivot member 59 to which is rockably secured an irregularly shaped interposer link 60. The opposite free end of link 60 is arcuately shaped as to 62 for purposes to be described shortly herein. An interconnecting rocking link 64 (vertically disposed in FIG. 1) is pivotally mounted at one end 66 to the intermediate lower edge of link 60, while the opposite end of link 64 is rockably pivoted to the lower portion of wall member 12 as at 68.

Rotation of pulley 62 by means (not shown) in the direction of arrow 56 causes a clock timing pulse to be sent to the software main high resolution clock control circuitry (not shown) which enables the imaging of drum 36 and paper advance from the sheet hopper (not shown), in time synchronism to the movement of linkage 50. Arcuate movement of the end of link 60 carries the scoop-shaped end 62 first downwardly, FIG. 1, then leftwardly, thence upwardly into the position shown in FIG. 2. It is noted, although not shown in detail in the drawing, that the scoop-shaped nose portion 62 of member 60 passes into a slightly upwardly through 1n elongated slot 70 in the horizontal track portion 72 of the horizontal track forming members 74—74.

Thereafter, continued rotation of drum pulley 52 causes link 60 to move in its rightwardly raised condition along slot 70 to a position 76, FIG. 1, slightly beyond pretransfer rolls 42-44 and during this forward motion acts to slightly slow the inward egress of paper 18 from the higher speed rollers so that the forward movement of the paper tends to assume the rotative speed of drum 36 so that complete and accurate registration with the movement of drum 36 can be made. Thus, the registration of the intelligible data on the drum can be imprinted on the paper without fear of losing detail or of having only a portion of the data present on the paper after the paper has passed over and across the curved top surface of the drum.

What is claimed is:

1. Apparatus for timing, synchronizing and registering individual sheet items of fixed dimension, said items being arranged to move along a prescribed pathway for precise registration with respect to printing means movable at a fixed rate comprising, an item interposer mechanism including an irregularly shaped member, the free end of which, includes means for momentarily interrupting the leading edge of a sheet item being fed to said printing means, an elongated link rockably, fixedly pivoted at one end with the opposite end thereof pivotally, drivingly, connected to said interposer mechanism intermediate the ends thereof enabling the end of said interposer member to move in an oblate, substantially rectiliner path, a rotatable member interconnectedly driven by said printing means and including means for periodically interrupting a light beam produced by light generating means operably associated with said rotatable member as said member is rotated, and means interconnecting the opposite end of said interceptor linkage to said rotatable member so that upon rotation of said rotatable member said interposer linkage is moved along said oblate, substantially rectiliner path to intercept each sheet item so as to synchronize the forward movement of said sheet item with the rotative movement of said printing means effective to cause said item to locate itself along said printing means in front to back and edge to edge alignment without item overlap or interference between items.

2. The invention in accordance with claim 1 wherein said rotatable member comprises a flat, circular disk and wherein said means for interrupting a light beam is a slot opening radially inwardly from one edge of said disk and wherein said interposer linkage is pivotally connected to said disk 180° in opposition to said slot.

* * * * *